US007493210B2

(12) United States Patent
Nassiff et al.

(10) Patent No.: US 7,493,210 B2
(45) Date of Patent: Feb. 17, 2009

(54) VEHICLE NAVIGATION METHOD

(75) Inventors: Amado Nassiff, Boynton Beach, FL (US); Huifang Wang, Sunnyvale, CA (US); Steven G. Woodward, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 09/925,586

(22) Filed: Aug. 9, 2001

(65) Prior Publication Data

US 2003/0033081 A1 Feb. 13, 2003

(51) Int. Cl.
*G01C 21/00* (2006.01)
(52) U.S. Cl. ............... 701/207; 701/202; 701/208; 701/209; 340/995.12; 340/995.24; 340/995.23; 340/996
(58) Field of Classification Search ................ 701/202, 701/207, 208, 209, 201, 206, 33; 340/989, 340/995.19, 995.12, 995.24, 995.23, 996, 340/993
See application file for complete search history.

(56) References Cited

U.S. PATENT DOCUMENTS

| 6,173,277 | B1 * | 1/2001 | Ashby et al. ................ 707/1 |
| 6,253,150 | B1 * | 6/2001 | Nakamura ................ 701/208 |
| 6,366,849 | B1 * | 4/2002 | Rychlak ................ 701/202 |
| 6,405,123 | B1 * | 6/2002 | Rennard et al. ............ 701/200 |
| 6,405,126 | B1 * | 6/2002 | Palomo et al. ............ 701/202 |
| 6,434,455 | B1 * | 8/2002 | Snow et al. ................ 701/33 |
| 6,434,458 | B1 * | 8/2002 | Laguer-Diaz et al. ......... 701/35 |
| 6,721,288 | B1 * | 4/2004 | King et al. ................ 370/310 |
| 2001/0046851 | A1 * | 11/2001 | Yamaguchi ................ 455/412 |
| 2002/0002438 | A1 * | 1/2002 | Ohmura et al. ............ 701/200 |
| 2002/0035619 | A1 * | 3/2002 | Dougherty et al. .......... 709/219 |
| 2002/0049529 | A1 * | 4/2002 | Ikeda ................ 701/200 |
| 2002/0165666 | A1 * | 11/2002 | Fuchs et al. ................ 701/209 |
| 2002/0188776 | A1 * | 12/2002 | Houlberg ................ 710/62 |
| 2003/0023371 | A1 * | 1/2003 | Stephens ................ 701/209 |
| 2003/0055555 | A1 * | 3/2003 | Knocheart et al. .......... 701/202 |
| 2003/0091324 | A1 * | 5/2003 | Tominaga ................ 386/46 |
| 2003/0093216 | A1 * | 5/2003 | Akiyama ................ 701/200 |
| 2003/0163251 | A1 * | 8/2003 | Obradovich et al. ........ 701/208 |
| 2003/0182052 | A1 * | 9/2003 | DeLorme et al. ............ 701/201 |
| 2003/0191584 | A1 * | 10/2003 | Robinson et al. ............ 701/209 |
| 2004/0254722 | A1 * | 12/2004 | Spencer et al. ............. 701/208 |

* cited by examiner

*Primary Examiner*—Khoi H. Tran
*Assistant Examiner*—Bria J. Broadhead
(74) *Attorney, Agent, or Firm*—Akerman Senterfitt

(57) ABSTRACT

A method for navigating in a vehicle includes the steps of identifying navigation information for at least one destination. The navigation information is stored in at least a first memory remote from the vehicle. The navigation information is transferred from the first memory to a navigation device in the vehicle. The vehicle can then be navigated to the destination using the navigation device and the navigation information.

2 Claims, 3 Drawing Sheets

VEHICLE NAVIGATION METHOD

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates generally to systems and methods for vehicle navigation, and more particularly to onboard navigation systems.

2. Description of the Related Art

An increasing number of vehicles have onboard navigation systems. Such systems typically rely in part on global positioning system (GPS) location and direction information. This information is combined with destination data and roadway data to formulate navigation information to provide the driver with assistance in navigating to the desired destination or destinations. Typically, navigation information can include maps and detailed driving instructions. Such onboard navigation systems require the user to enter destination information in order for the system to determine the navigation information.

Often, more complicated itineraries can be researched using various travel-related information systems in order to arrive at a most desired travel itinerary. This itinerary might include particular hotels along the trip path where it is desired to stay, and particular restaurants that are selected for dining. Various attractions and sightseeing opportunities might also be part of the itinerary. The selection of such a detailed itinerary can require the manual keying-in of the desired locations into the onboard navigation system of the vehicle. Additionally, if more than one vehicle is to be used for the same trip, the data must be entered individually for each vehicle.

Entering data into such onboard navigation systems is difficult, because the ergonomics are not favorable for data entry and because such systems rarely have a full keyboard, mouse, or other conventional data entry device. Entering data also can be time consuming and difficult not only in view of the lack of full keyboard and mouse data input devices, but also if the destination is not recognized by the navigation system, additional information about the destination might also have to be entered. Most drivers prefer to contemplate and plan among different destination alternatives in the comfort of their home or office, and using the interface advantages of a personal computer.

SUMMARY OF THE INVENTION

A method for navigating in a vehicle includes the step of identifying navigation information for at least one destination. The navigation information is stored in at least a first memory remote from the vehicle. The navigation information is transferred from the first memory to a navigation device in the vehicle. The vehicle can then be navigated to the destination using the navigation device and the navigation information that has been transferred to the vehicle.

The identification of the navigation information can be performed on a personal computer. Alternatively, the identification of navigation information can be performed on any other suitable device, such as a handheld computer. Exemplary handheld computers can include cellular phones, two-way paging devices and personal digital assistants (PDA). The navigation system can be any suitable information useful for navigation. The navigation information reveals individual's location data. The location data is preferably GPS coordinates, but can be in any other format useful to the particular navigation device used by the vehicle. For example, some navigation devices might have location data stored in memory for certain destinations. Thus, the user would enter "GROCERY STORE" and the navigation system would retrieve the GPS coordinates from memory. The navigation information can be obtained from an appropriate Web site, or from an appropriate navigation information system.

The navigation information can be stored on a portable storage media, such as a floppy disk, CD rom, or other suitable storage media. The portable storage media is transferred to the vehicle and placed into an appropriate device provided with the navigation device in order to read the information on the portable storage media and to transfer the information to the navigation device. In the case of a CD ROM, a CD ROM drive would be provided with the navigation device in order to read information from the CD ROM into the navigation device.

Alternatively, the navigation information can be stored in a memory associated with the network. The navigation device is connectible to the network for receiving the navigation information from the network memory. The connection between the navigation device and the network can be a wireless or wireline connection. Once received in the network, the navigation information can be placed into a queue, such that the navigation information and other data are automatically downloaded from the network when the navigation device is connected to the network.

The navigation information may be formatted so as to be directly transferrable to the navigation device. In another aspect of the invention, however, formatting is performed on the navigation information in order to place the navigation information into an appropriate format for the particular navigation device of the vehicle.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
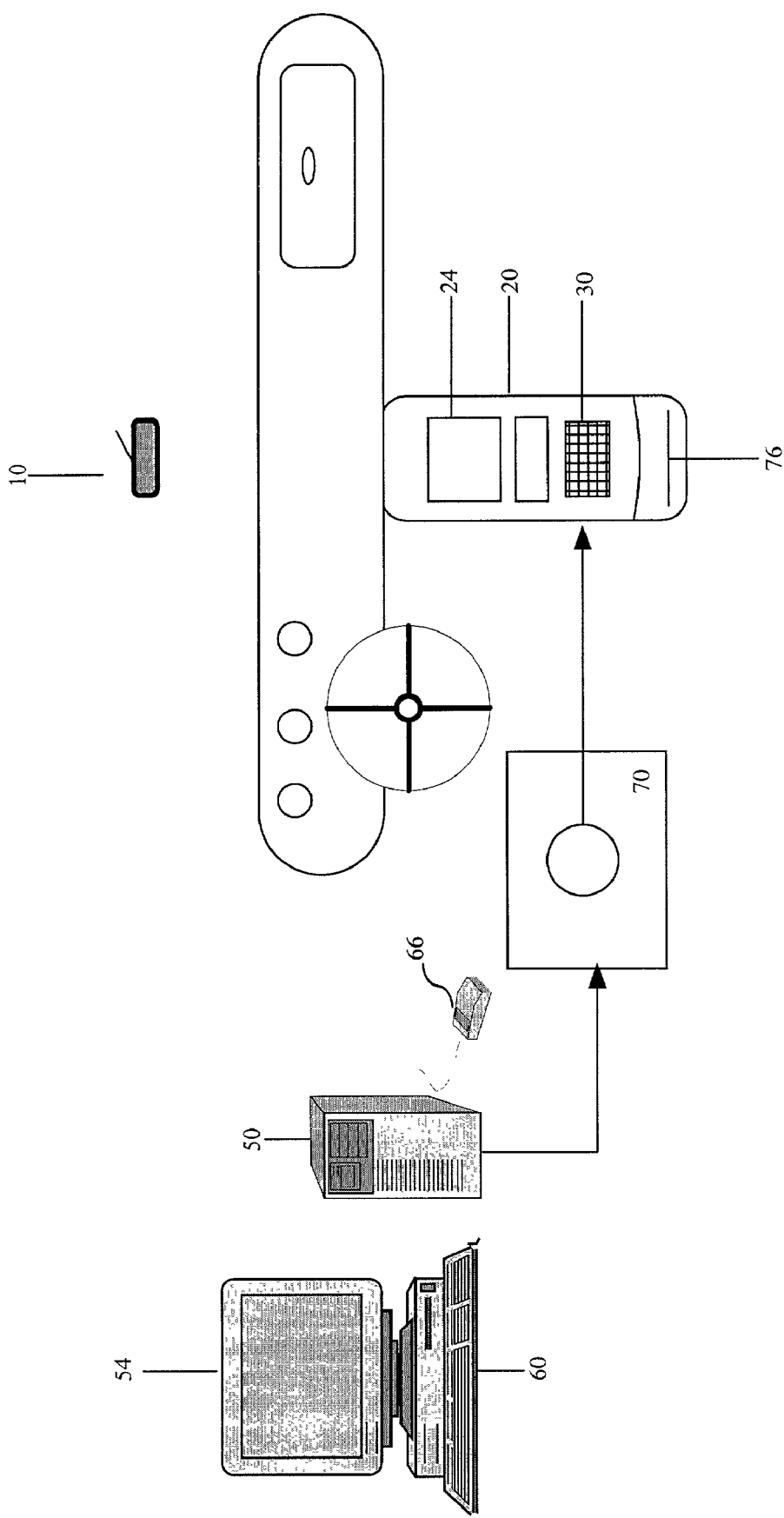
FIG. 1 is a schematic diagram illustrating the identification of navigation information and the transmission of such data to an onboard navigation system.

There is shown in FIG. 1 the dashboard 10 of an automobile which is equipped with an onboard navigation device 20. The onboard navigation device can have any suitable construction, but typically will have a display terminal 24 and a data input device such as keyboard 30. The keyboard 30 typically is not a conventionally sized, 104-key keyboard owing to the space limitations of the vehicle where, as shown, the navigation device is typically integrated into the dashboard or center console of the vehicle. Moreover, the keyboard can be integrated with the onboard navigation device 20, wherein, for example, the onboard navigation device 20 includes a touch-screen display.

The navigation device 20 can, in one aspect, be used in conventional fashion. In this instance, the keyboard 30 is used to input destination data by which the navigation device 20 calculates a preferred route to the destination, and also informs the driver of various information along the way such as distance to the destination, travel speed, and whether there has been any deviation from the most desired path. This information is calculated with the assistance of a GPS positioning system, which is typically provided in the vehicle to work in conjunction with the navigation device 20.

In a preferred embodiment, a personal computing device such as the personal computer 50 is used in order to determine at least one desired destination. The computer 50 can be of any suitable construction, can include those personal computers manufactured by International Business Machines Corporation of Armonk, N.Y. The personal computer 50 has a video display monitor 54, and data input device such as full keyboard 60 and mouse 66. The provision of full keyboard 60 and mouse 66 greatly facilitates the obtaining of destination information and trip planning by the user. This destination information can be used to identify navigation information such as location data for each desired destination.

The location data can be stored in memory, such as a portable storage media 70. The portable storage media can be any suitable media, for example a CD-ROM or floppy disk. Other types of personal storage media also are suitable, for instance removable solid state memory devices such as flash memory, PCMCIA memory cars and the like. Once stored, the location data can be retrieved from the storage media 70 on demand by the navigation system 20 as indicated by the arrows of FIG. 1.

The location data that has been entered into the navigation device can then be used in conventional forum to compute a preferred route to the desired destination or destinations. Advantageously, the invention avoids the need for the driver to waste driving time by entering destinations into the navigation device 20 using the small keyboard 30 or other data input device of the navigation device 20. Also, owing to the amount of information that can be stored in the portable storage media, the invention allows much more information to be input into the navigation device if the navigation device is appropriately modified to receive such data. Such data may include detailed trip information concerning sites along the way, various restaurants available for dining, road hazards and detours, and the like.

Figure 2:
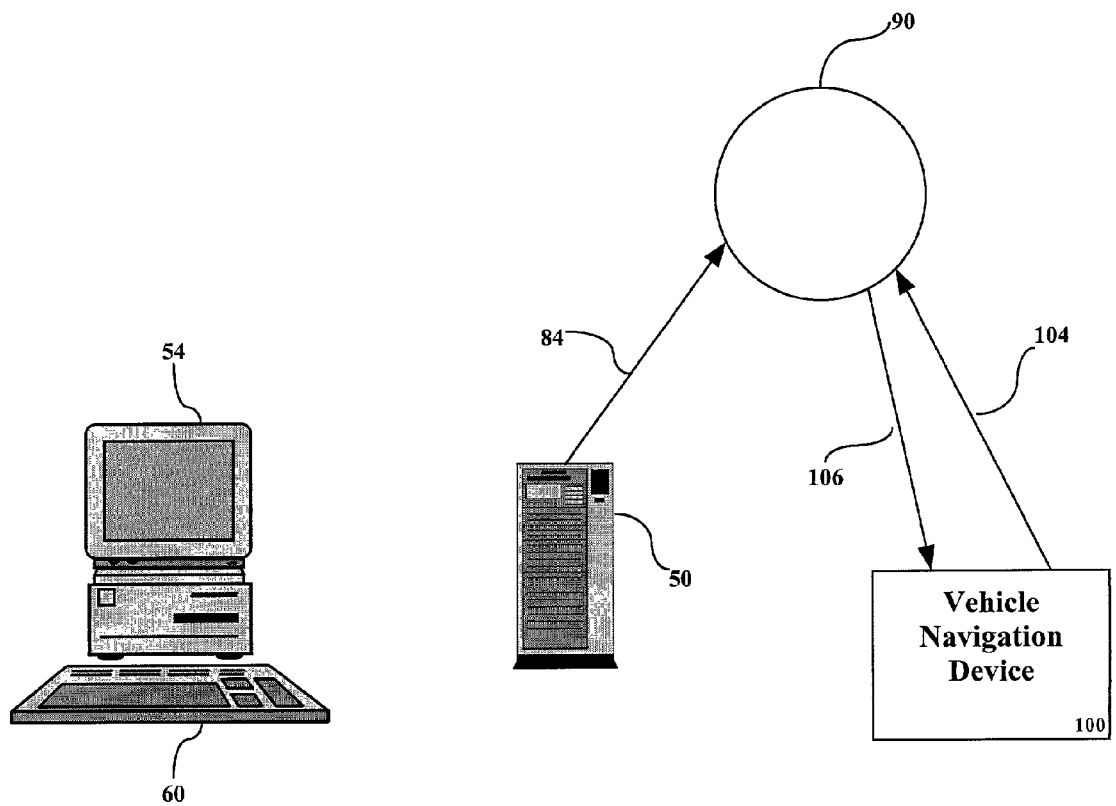
FIG. 2 is a schematic representation of an embodiment of the invention utilizing a computer network.

In FIG. 2 there is shown an alternative embodiment of the invention in which the personal computer 50 is connected via communications link 84 to network 90. In one aspect of the invention, the communications link 84 can be a wireless link such as a short-range or long-range radio frequency link. However, the invention is not limited in this regard and in a second aspect of the invention, the communications link 84 can be a wireline link such a high-speed point-to-point link or a network connection. In any case, the navigation information and location data can be uploaded via the communications link 84 to the network 90 and stored in memory therein.

By comparison, the vehicle navigation device 100 can connect to the network 90 via upload link 104 and, upon identification of the vehicle navigation device 100, navigation information and location data can be downloaded to the vehicle navigation device 100 via download link 106. Notably, the upload link 104 and download link 106 can be implemented using a single communications link similar to the communications link 84. However, in an alternative aspect of the invention, the upload link 104 and download link 106 can be implemented using separate communications links. Importantly, by using the communications links of the present invention, the necessity of transferring navigation information and location data via a portable storage media such as floppy disc or CD ROM from the personal computer to the vehicle navigation device can be avoided.

Figure 3:
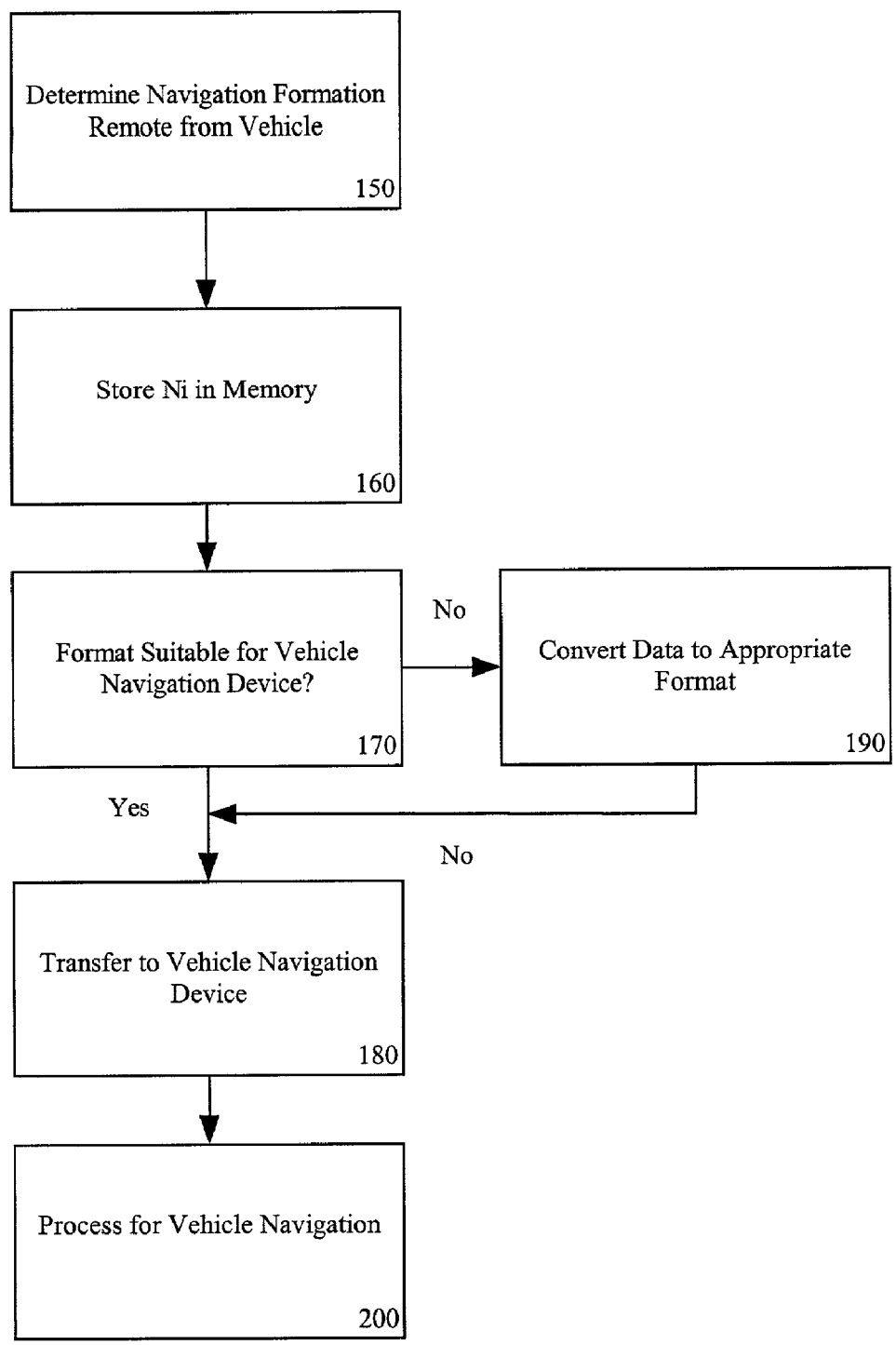
FIG. 3 is a block diagram illustrating the method of the invention.

A method for navigating a vehicle according to the invention is illustrated by the block diagram shown in FIG. 3. In block 150 the user determines navigation information remote from the vehicle. The navigation information is stored in a memory as indicated by block 160. In block 170, it is determined whether the format of the data is suitable for the vehicle navigation device. If it is, then it is transferred to the vehicle navigation device as indicated by block 180. If it is not, it is converted to an appropriate format in block 190. The navigation information is then processed for vehicle navigation in block 200.

This invention can be embodied in other forms without departing from the spirit or essential attributes thereof, and accordingly, reference should be had to the following claims, rather than to the foregoing specification, as indicating the scope of the invention.

We claim:

1. A method for vehicle navigation comprising the steps of:
accessing a publicly accessible Web site using a computing device that is remote from a vehicle;
identifying within said Web site at least one destination in response to a user input specifying a trip itinerary, the at least one destination corresponding to at least one of a lodging, dining establishment, and predetermined sightseeing attraction each identified within said Web site in response to and based upon the specified trip itinerary;
automatically determining navigation information for said itinerary, wherein at least a portion of said navigation information includes geographic coordinates for said identified destination as well as trip information indicating locations of and information pertaining to other dining establishments, other sightseeing attractions, other lodging accommodations, road hazards, and detours corresponding to the user-specified trip itinerary;
uploading said navigation information to a network via a communications link and storing said navigation information in a memory in the network, wherein said memory is remote from said vehicle;
connecting an in-vehicle navigation device to the network via an upload link and a download link;
identifying the in-vehicle navigation device by the network via the upload link;
upon identification of the in-vehicle navigation device, transferring said navigation information stored in the memory in the network to said in-vehicle navigation device via the download link;
determining whether a data format of said navigation information conforms to data requirements of said in-vehicle navigation device prior to transferring said navigation information; and
converting said data format of said navigation information to an alternate data format prior to transferring said navigation information if said data format does not conform to data requirements of said in-vehicle navigation device.

2. A machine-readable storage having stored thereon, a computer program having a plurality of code sections, said code sections executable by a machine for causing the machine to perform the steps of:

accessing a publicly accessible Web site using a computing device that is remote from a vehicle;

identifying within said Web site at least one destination in response to a user input specifying a trip itinerary, the at least one destination corresponding to at least one of a lodging, dining establishment, and predetermined sightseeing attraction, each identified within said Web site in response to and based upon the specified trip itinerary;

automatically determining navigation information for said itinerary, wherein at least a portion of said navigation information includes geographic coordinates for said identified destination as well as trip information indicating locations of and information pertaining to other dining establishments, other sightseeing attractions, other lodging accommodations, road hazards, and detours corresponding to the user-specified trip itinerary;

uploading said navigation information to a network via a communications link and storing said navigation information in a memory in the network, wherein said memory is remote from said vehicle;

connecting an in-vehicle navigation device to the network via an upload link and a download link;

identifying the in-vehicle navigation device by the network via the upload link;

upon identification of the in-vehicle navigation device, transferring said navigation information stored in the memory in the network to said in-vehicle navigation device via the download link;

determining whether a data format of said navigation information conforms to data requirements of said in-vehicle navigation device prior to transferring said navigation information; and converting said data format of said navigation information to an alternate data format prior to transferring said navigation information if said data format does not conform to data requirements of said in-vehicle navigation device.

* * * * *